Feb. 24, 1953 — L. F. WILLIAMS — 2,629,480

FEEDER FOR FRUIT PROCESSING MACHINES

Filed Oct. 6, 1947

INVENTOR.
LLOYD F. WILLIAMS
BY Harold W. Mattingly
Attorney

Patented Feb. 24, 1953

2,629,480

UNITED STATES PATENT OFFICE 2,629,480

FEEDER FOR FRUIT PROCESSING MACHINES

Lloyd F. Williams, Anaheim, Calif.

Application October 6, 1947, Serial No. 778,218

2 Claims. (Cl. 198—28)

My invention relates to a fruit feeding mechanism for fruit juicing or pulping machines, and has particular reference to a rotary feeder employing positive ejection of the fruit.

The present invention is an improvement upon the feeder mechanism disclosed in my copending application, Serial No. 744,622, filed April 29, 1947. My prior application discloses a fruit juicing machine particularly adapted for the juicing of citrus fruits such as oranges, lemons, and grapefruit. It will be obvious, however, to those skilled in the art, that the feeder mechanism disclosed in my prior application has utility on any type of fruit processing machine, and is not limited to citrus fruits. Likewise the present invention is of general utility in the fruit processing field, and is not limited to the feeding of citrus fruits.

In general the present feeder mechanism is in the form of a rotary wheel having a radial array of slots sufficiently wide and deep so that each may receive a single fruit of the particular size being processed. The wheel is adapted to rotate above an annular plate upon which the fruit may ride, and while the axis of the wheel may be disposed at any angle, I prefer to have the axis disposed generally vertically. A stationary cylinder may be disposed about the periphery of the wheel so that the fruit may roll thereagainst when thrown outwardly by the centrifugal force of the rotating wheel. The stationary cylinder may be slotted at an appropriate point to permit the fruit to pass outwardly from the rotary wheel, and thence into the treating machine proper.

A positive ejectment of the fruit through the slot in the enclosing cylinder is provided particularly in accordance with my invention, and may be accomplished by disposing a stationary scoop opposite the feeding slot in the cylinder so that the fruit may be positively pushed through the slot as the wheel rotates. If desired, trailing spring fingers may also be attached to the scoop to project through the feeding slot so as to maintain the fruit in an ejected condition.

It is therefore a general object of my invention to provide an improved feeding mechanism for fruit processing machines wherein the feeder may operate at a high rate of speed.

Another object of my invention is to provide a rotary type feeder having a positive ejection.

Still a further object of my invention is to provide a rotary type of feeder for fruit processing machines wherein the feeder is provided with a scoop to force the fruit outwardly of the feeder.

Another object of my invention is to provide an improved feeder for fruit juicing machines of the type disclosed in my copending application mentioned previously.

Other objects and advantages of my invention will be apparent in the following description and claims, considered together with the accompanying drawings, in which Fig. 1 is a plan view of a presently preferred embodiment of my rotary feeder, together with fragmentary portions of an illustrative fruit feeding machine;

Figure 1:
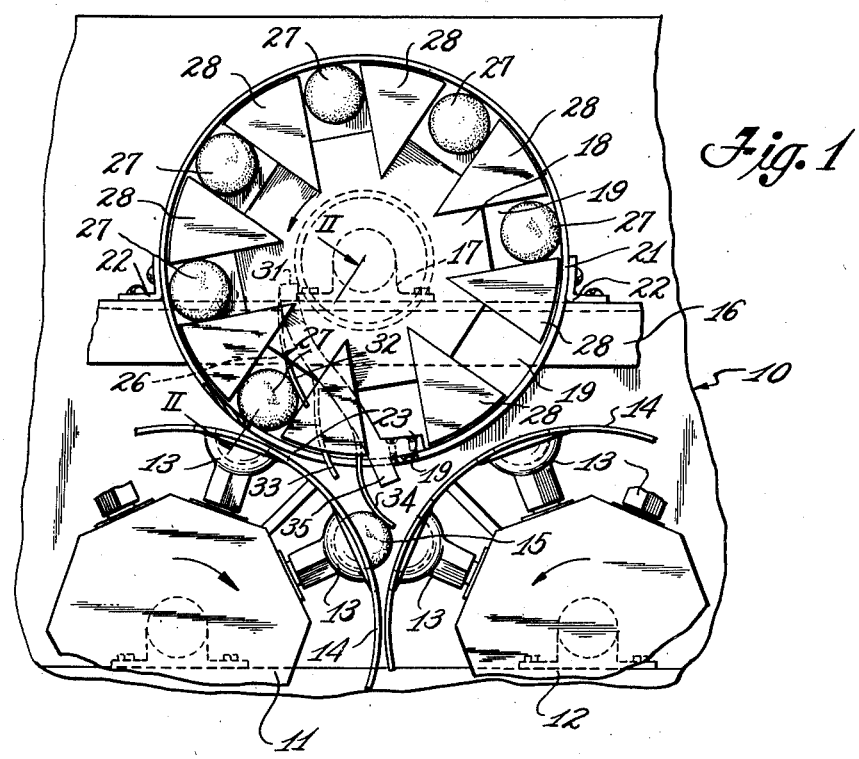

Referring to Fig. 1, a fruit processing machine 10 may include a pair of rotatable turrets 11 and 12, each having radially projecting cups 13 projecting through a cylindrical skirt 14. These turrets 11 and 12 are merely illustrative of one type of fruit processing machine that may employ my feeder mechanism. The turrets 11 and 12 may rotate so as to cup a fruit 15 between a pair of cups 13, one on each turret, so that the fruit may be conveyed to a slicing mechanism or a juicing or pulping mechanism, as desired. While the feeder has been designed for a processing machine employing turrets of the general type illustrated, it will be obvious that it is of general utility on any type of fruit processing machine.

The processing machine 10 may include a structural beam 16 having a bearing 17 secured thereto for the support of a rotary wheel 18 provided with radial slots 19. A stationary cylinder 21 may surround the wheel 18 and may be mounted rigidly upon the structural member 16 by any suitable means, for example angle brackets 22. The cylinder 21 may be provided with an ejection slot 23 through which fruit may be ejected into a cup 13 of one of the turrets 11 or 12.

Referring now to all of the drawings, it will be noted that an annular plate 24 may underlie the slotted portions of the wheel 18 and may rotate therewith by means of an adjustable attachment to a hub 20 upon which the wheel 18 may be mounted. The adjustable attachment may be of any desired type, for example including bolts 24a passing through the plate and threading into the hub 20. It will be noted particularly with respect to Fig. 2 that the slots 19 of the wheel are spaced a considerable distance above the rotary plate 24 so that a stationary scoop 26 may be secured to the stationary cylinder and pass between the wheel 18 and the plate 11. Accordingly, as the wheel 18 rotates, fruit 27 will be thrown by centrifugal force into each slot 19 and will be carried around by the rotation of the wheel. The fruit will be supported upon the annular plate 24 and may roll against the enclosing cylinder 21.

Figure 2:
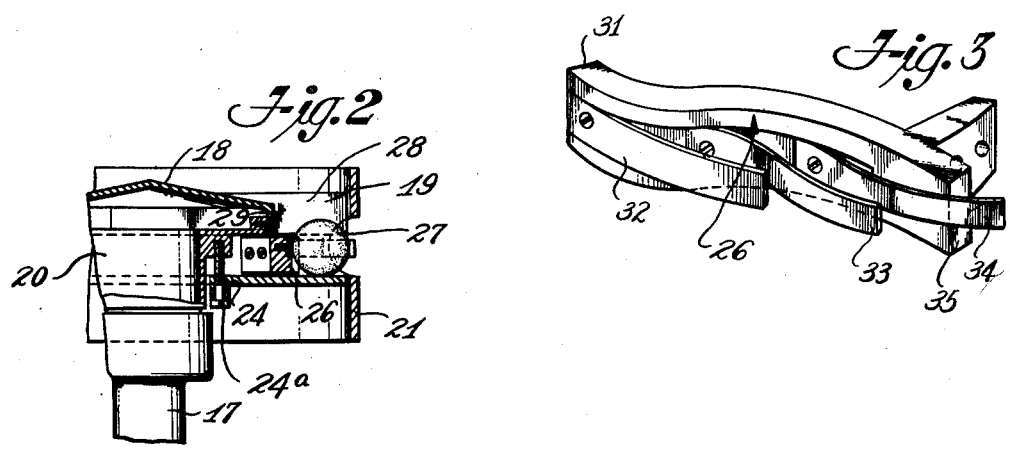
Fig. 2 is a sectional view taken along the line II—II of Fig. 1.

The detail construction of the rotary wheel is best illustrated with reference to Figs. 1 and 2, and it will be noted that a raised segment element 28 may be provided on the wheel between each pair of fruit slots 19. These raised segments 28 assist in the distribution of the fruit to the slots as the fruit is poured into the enclosure of the stationary cylinder 21 from an overhead conveyor or other fruit supply source. The side walls of the slots 19 physically engage the fruit to cause it to roll around the circular path of travel. The inward extent of the radial slots 19 may be fixed by a wall portion 29.

Figure 3:
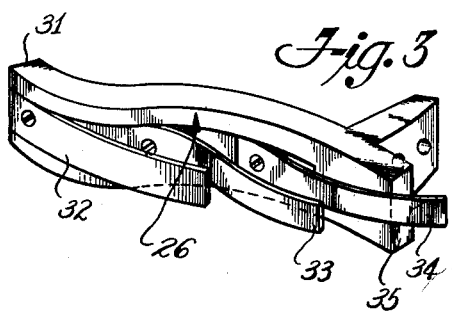
Fig. 3 is a perspective view of an illustrative scoop mechanism incorporating my invention.

It will be noted, particularly with respect to Figs. 1 and 3, that the scoop member 26 may be a block having a curved outline somewhat in the form of a modified letter S, although a simple curve would suffice. The scoop 26 is so located with respect to the rotary wheel 18 that its forward end 31 is disposed slightly inwardly of the wall 29 of each slot 19. This disposition of the scoop 26 insures that the end 31 will not contact any fruit.

The scoop 26 is also provided with spring members 32, 33 and 34 that engage the fruit 27 as they approach the outlet slot 23 in the enclosing cylinder 21. Accordingly, as the wheel 18 drives the fruit into engagement with the scoop 26, the fruit will first strike the forward spring members 32 and 33, and will be positively ejected outwardly of the outlet slot 23. By making the members 32, 33 and 34 of resilient material, the fruit is maintained in an undamaged condition, inasmuch as the members will deflect upon receiving fruit of an unusual contour or size compared to the standard being operated upon. The entire scoop could, however, theoretically be of solid material. Further rotation of the wheel 18 past the position illustrated in Fig. 1 will cause the fruit 27 to be ejected outwardly into the cup 13, which rotates in synchronism with the feeder wheel 18 so as to dispose the cup 13 opposite a slot 19.

I have found that a single resilient member attached to the scoop will not accommodate all sizes of fruit, inasmuch as a succeeding fruit may deflect a spring member to cause it to release its grip upon the prior fruit positioned within the associated cup 13. For this reason I provide the plurality of resilient fingers 32, 33 and 34 so that the first fingers 32 and 33 may act upon the fruit being ejected, and so that the trailing finger 34 will act upon the prior fruit ejected and already seated in a cup 13. This retention of a fruit by the second finger 34 is clearly illustrated in Fig. 1. Thereafter the opposing cups 13 on opposite turrets 11 and 12 will securely cup the fruit so that it cannot become unseated. A trailing end 35 on the scoop block will prevent bending of spring 34 that would cause it to touch the turret 12.

In operation, fruit may be fed in a continuous quantity to the center of the wheel 18 and will be restrained from rolling outwardly therefrom by the stationary enclosing cylinder 21. The raised segments 28 between the slots 19 will cause the fruit to roll into the slots 19, and thereafter the fruit will be retained in the slots by gravity and centrifugal force. As the wheel 18 rotates, the fruit 27 will be revolved towards the outlet opening 23 by rolling against the outer cylinder 21. As the fruit is revolved toward the outlet opening 23, it will be contacted by the scoop 26 which will positively thrust the fruit radially outwardly. As the fruit is revolved directly opposite the opening 23, it will contact the first fingers 32 and 33 of the scoop 26 and will be positively ejected out of the feeder slot in which it has been riding. This ejectment may be into any suitable fruit processing machinery, and for illustrative purposes the synchronized rotating turret 11 having cups 13 is illustrated for receiving the fruit. Accordingly a fruit 27 may be thrust outwardly into the synchronized cup 13 immediately opposite, and will be held therein by the outer end of the resilient finger 33. Thereafter the fruit (now referred to by the numeral 15) will be retained in its cup 13 by the trailing resilient finger 34 which contacts it until it is about to be cupped by an opposite cup 13 on the second turret 12.

The positive ejection action permits the feeder, and hence the processing machine, to be operated at an extremely high rate of speed. For example, I have successfully fed and processed 300 citrus fruit per minute by employing a feeder of the general construction illustrated in Fig. 1. There is no reliance upon centrifugal force or other non-positive force, inasmuch as I employ a positive scoop action for ejecting the fruit from the feeder into the processing portions of a fruit treating machine.

In actual practice, the wheel 18 is made removable so that various wheels may be substituted having slot widths that vary so that the proper slot width may be selected for the size of fruit being processed. The annular plate 24 may also be varied in position according to fruit size so that there will be no tendency for the fruit to be pinched between the plate and the slots.

While I have described my invention with respect to a specific embodiment thereof, I do not limit myself to this embodiment, since it is obvious that various modifications could be made therein without departing from the true spirit and scope of my invention. For example, instead of slots in the rotary wheel 18 there could be provided troughs having a bottom. Also, the plate 24 could be stationary and the scoop secured thereto. Likewise it is conceivable that a rotary cylinder could encircle the wheel having a door-opening action at the proper time to eject fruit into the processing portions of the machine. Further, my invention is not necessarily limited to wheel feeders, and is effective with any type of conveyor, whether it be endless chain, belts, gravity feed down a trough, or any other type of conveyor. Various other expedients will be obvious to those skilled in the art. Accordingly the disclosure of my invention is merely illustrative and not definitive of my invention.

I claim:

1. A fruit processing machine comprising: a pair of oppositely rotating fruit processing turrets having cups formed on the outer periphery thereof so that a fruit may be cupped between the turrets in a region generally between the axes of the turrets; a fruit feeding wheel disposed adjacent one of the turrets and having a radial array of recesses and synchronized for rotation with the turrets, the wheel being rotatable on a vertical axis and having an open upper side to receive fruit into the array of recesses; a stationary cylinder disposed about the wheel and having an outlet opening approximately at the point of adjacency of the wheel and the one turret; and a scoop member disposed to intersect the recesses at the region of the opening and having a first and a second trailing finger so that the first finger will eject the fruit outwardly of the opening and into a synchronized cup, and said second finger being extended outwardly beyond said cylinder so that the second finger will retain within the cup the prior ejected fruit until it is cupped by a cup of the other turret.

2. A fruit feeding mechanism for a fruit processing machine including a rotary feeding wheel having outwardly open fruit holding pockets about its edge, a stationary retaining element lying about said wheel and having an outlet opening therein, a pair of receiving turrets lying closely adjacent each other and rotatable in opposite directions and defining an inlet bight, said receiving turrets having complementary pockets about the edges thereof, the outlet opening of said retaining element being located at the mouth of said bight, and a scoop intersecting the path of fruit carried in said feeding wheel pockets and extending into the bight formed by said receiving turrets.

LLOYD F. WILLIAMS.

REFERENCES CITED

The following references are of record in the file of this patent:

UNITED STATES PATENTS

| Number | Name | Date |
|---|---|---|
| 1,212,754 | Fleischer | Jan. 16, 1917 |
| 1,844,869 | Hauger et al. | Feb. 9, 1932 |
| 1,888,528 | Faulds | Nov. 22, 1932 |
| 1,952,418 | Chapman | Mar. 27, 1934 |
| 2,270,007 | McKinnis | Jan. 13, 1942 |
| 2,500,030 | Hait | Mar. 7, 1950 |